United States Patent Office 3,340,069
Patented Sept. 5, 1967

3,340,069
METHOD OF PREPARING A COMPOUND SEASONING
Iwao Matsuda, Tokyo, and Akio Shiga, Hideyuki Furukawa, and Akio Kanemitsu, Machida-shi, Japan, assignors to Kyowa Hakko Kogyo Co., Ltd., Tokyo, Japan, a corporation of Japan
No Drawing. Filed July 8, 1964, Ser. No. 381,223
Claims priority, application Japan, July 12, 1963, 38/35,590
5 Claims. (Cl. 99—140)

This invention relates to coated compound seasonings such as coated mono-sodium glutamate, and to methods for producing the same. More particularly this invention relates to compound seasoning such as mono-sodium glutamate coated evenly with other seasoning, and to methods for producing the same by mixing and stirring the principal ingredient such as mono-sodium glutamate with other seasoning while flowing saturated steam or wet steam into the resultant mixture at a temperature of 50° to 100° C.

In preparing compound seasonings a coating method employing an organic solvent, a pressure shaping method and a granulating method have been generally employed, but these methods require special apparatus and are correspondingly expensive. Moreover they not only require a large amount of heat energy in drying, solvent recovery and the like, but also the increase of cost due to loss of solvent during the recovery thereof is a problem which cannot be ignored.

It is an object of the present invention to provide coated seasonings having free flow property, high degree of homogeneity and such transparency as is not impaired by the coating. It is another object of the present invention to provide methods for coating a seasoning such as mono-sodium glutamate without the necessity of employing such special apparatus as is required in conventional coating methods. It is yet another object to provide methods for coating a seasoning such as mono-sodium glutamate, which require no solvent and a much lower amount of heat energy expenditure, in comparison with conventional methods; accordingly, methods enabling coating to be accomplished at much lower production cost than by conventional methods.

In the practice of the present invention, a mixture of seasonings, such as mono-sodium glutamate and fine seasoning powder to be coated thereon, such as inosinic acid, guanylic acid, aspartic acid, succinic acid, substances associated with nucleic acid, acid type of relish substances, or their salts, is charged into a mixer and subjected to homogeneous mixing while maintaining the temperature of the contents at about 50° to 100° C. within which limit the temperature varies depending upon the amount and varieties of other seasoning material to be added with sodium glutamate by blowing in saturated steam or wet steam in an amount to wet only slightly the surface of the seasonings, such as mono-sodium glutamate, being coated. As the coating of the surface of seasoning such as mono-sodium glutamate is carried out evenly with the additive seasoning, the transparency of the seasoning being coated, such as mono-sodium glutamate, is retained almost completely. This is entirely impossible for any conventional method to achieve.

As for the amount of steam used in the present method, the minimum amount just capable of dissolving the flavor-imparting nucleotides (additive seasoning) at the temperature of operation is generally preferable. Theoretically, in e.g. the case of di-sodium 5'-inosinic acid salt, the amount of steam required for wetting is as follows:

| At: | Mg./ml. (milligrams per milliliter) |
|---|---|
| 60° C. | About 480 |
| 70° C. | About 580 |
| 80° C. | About 680 |

By the theoretical amount of steam or water is meant a minimum amount of water to dissolve the coating material and then to coat the mono-sodium glutamate with the dissolved material. If an undue excess of water is employed, the mono-sodium glutamate crystals will aggregate and stick to each other.

As for the temperature of the steam, it is preferably in the range of 50° to 100° C. to attain the object of making the coating readily performable and preventing the substances employed from being decomposed.

The value, importance and feature of the present invention lies in the point that it utilizes the hygroscopic property and solubility of the seasoning ingeniously. There is no fear that the crystals of the seasoning material being coated, such as mono-sodium glutamate crystals, may adhere to each other or that the coating may separate from the substrate during the drying operation.

A more comprehensive understanding of the invention can be obtained by referring to the following illustrative, but non-limitative examples of presently preferred embodiments of the invention.

*Example 1.*—A combination of mono-sodium glutamate and di-sodium 5'-inosinate 99.1 g. (grams) of mono-sodium glutamate of commercial grade and 900 mg. (milligrams) of finely powdered (finer than 200 mesh) di-sodium 5'-inosinate are admixed, while stirring, steam being blown into the mixture in an amount sufficient to provide 2 to 2.6 ml. of condensed water and to keep the temperature of contact between the blown-in steam and the mixture at about 50° C. (For the purpose of coating, 1 to 1.3 ml. (milliliters) of condensed water are necessary but it is preferred to add twice this amount of water, but not more).

After completion of the steam treatment, the product is dried. This is effected in per se conventional manner, e.g. by a stream of hot air (50° C.).

1 g. of sample is taken from each fraction of resulting product separated according to mesh size and the content of di-sodium 5'-inosinate is determined as shown in Table 1. Figures in this and other tables hereinafter set forth are in terms of milligrams of di-sodium 5'-inosinate (or corresponding other coating material) included in 1 g. of product. In the case of Table 1, 0.9 percent by weight of di-sodium 5'-inosinate (relative to the weight of the mixture) was admixed with the sodium glutamate. Figures in each bracket indicate efficiency of coating.

TABLE 1

| Sample No. | Mesh size | | |
|---|---|---|---|
| | 20–35 | 35–50 | 50–100 |
| 1 | 8.73 mg. (97%) | 8.82 mg. (98%) | 8.82 mg. (98%). |
| 2 | 8.775 mg. (97.5%) | 8.64 mg. (96%) | 8.829 mg. (98.1%). |
| 3 | 8.757 mg. (97.3%) | 8.775 mg. (97.5%) | 8.82 mg. (98%). |

The product of the example is a free-flowing homogeneous mixture of transparent crystals of mono-sodium glutamate uniformly coated with a thin coating of di-sodium 5'-inosinate.

While mono-sodium glutamate is here selected as presently preferred substrate or principal ingredient of the compound seasoning, it may be replaced with essentially like favorable results by any of the other hereinbefore-enumerated seasoning or flavoring substances. The coating in each case is of course different from the substrate material.

*Example 2.—A combination of mono-sodium glutamate and di-sodium 5'-inosinate*

95 g. of mono-sodium glutamate of commercial grade, and 5 g. of di-sodium 5'-inosinate are treated at a temperature of 60° C. as in Example 1. Samples are taken from resulting product, after drying, and subjected to quantitative analysis, the result of which is shown in Table 2. In the case of Table 2, 5.0 percent by weight of di-sodium 5'-inosinate (relative to the weight of the mixture) was admixed with the mono-sodium glutamate.

TABLE 2

| Sample No. | Mesh size | | |
|---|---|---|---|
| | 20-35 | 35-50 | 50-100 |
| 1 | 48.5 mg. (97%) | 48.85 mg. (97.7%) | 48.75 mg. (97.5%) |
| 2 | 48.6 mg. (97.2%) | 48.5 mg. (97%) | 49.05 mg. (98.1%) |
| 3 | 48.5 mg. (97%) | 49.0 mg. (98%) | 49.0 mg. (98%) |

The product of Example 2 has the same properties as that of Example 1.

*Example 3.—A combination of mono-sodium glutamate and di-sodium 5'-guanylate*

By repeating Example 2, except that a temperature of 80° C. and di-sodium 5'-guanylate are used instead of 60° C. and di-sodium 5'-inosinate, a product is obtained. Samples taken from this product, after drying, are subjected to quantitative analysis as in Example 2, the result of which is shown in Table 3. In the case of Table 3, 0.9 percent by weight of di-sodium 5'-guanylate (relative to the weight of the mixture) was admixed with the mono-sodium glutamate.

TABLE 3

| Sample No. | Mesh size | | |
|---|---|---|---|
| | 20-35 | 35-50 | 50-100 |
| 1 | 8.775 mg. (97.5%) | 8.757 mg. (97.3%) | 8.775 mg. (97.5%) |
| 2 | 8.82 mg. (98%) | 8.82 mg. (98%) | 8.739 mg. (97.1%) |
| 3 | 8.811 mg. (97.9%) | 8.838 mg. (98.2%) | 8.793 mg. (97.7%) |

The product of the present example is a free-flowing homogeneous mixture of uniformly thin-coated crystals of mono-sodium glutamate. The transparency of the latter has not been impaired by the di-sodium 5'-guanylate.

*Example 4.—A combination of mono-sodium glutamate and di-sodium 5'-guanylate*

By repeating Example 3 except that a temperature of 95° C. is used instead of 60° C., a product is obtained. Samples taken from this product, after drying, are subjected to quantitative analysis, as in Example 3, the result being shown in Table 4. In the case of Table 4, 5.0 percent by weight of di-sodium 5'-guanylate (relative to the weight of the mixture) was admixed with the mono-sodium glutamate.

TABLE 4

| Sample No. | Mesh size | | |
|---|---|---|---|
| | 20-35 | 35-50 | 50-100 |
| 1 | 48.95 mg. (97.9%) | 49.25 mg. (98.5%) | 48.95 mg. (97.9%) |
| 2 | 49.2 mg. (98.4%) | 48.9 mg. (97.8%) | 48.75 mg. (97.5%) |
| 3 | 49.0 mg. (98%) | 49.2 mg. (98.4%) | 48.65 mg. (97.3%) |

The product of this example has the same good properties as that of Example 3.

*Example 5.—A combination of mono-sodium glutamate and mono-sodium aspartate*

By repeating Example 4 except that a temperature of 50° C. and mono-sodium aspartate are used instead of 95° C. and di-sodium 5'-guanylate, a product is obtained. Samples taken from this product, after drying, are subjected to quantitative analysis as in Example 4, the result being shown in Table 5. In the case of Table 5, 0.9 percent by weight of mono-sodium aspartate (relative to the weight of the mixture) was admixed with the mono-sodium glutamate.

TABLE 5

| Sample No. | Mesh size | | |
|---|---|---|---|
| | 20-35 | 35-50 | 50-100 |
| 1 | 7.752 mg. (96.9%) | 8.82 mg. (98%) | 8.73 mg. (97%) |
| 2 | 8.748 mg. (97.2%) | 8.802 mg. (97.8%) | 8.75 mg. (97.3%) |
| 3 | 8.811 mg. (97.9%) | 8.775 mg. (97.5%) | 8.775 mg. (97.5%) |

The product of this example is a free-flowing homogeneous mixture of transparent crystals of mono-sodium glutamate uniformly coated with a thin coating of mono-sodium asparate.

*Example 6.—A combination of mono-sodium glutamate and mono-sodium asparate*

By repeating Example 5 except that a temperature of 80° C. is used instead of 50° C., a product is obtained. Samples taken from this product, after drying, are subjected to quantitative analysis as in Example 5, the result being shown in Table 6. In the case of Table 6, 5.0 percent by weight of mono-sodium asparate (relative to the weight of the mixture) was admixed with the mono-sodium glutamate.

TABLE 6

| Sample No. | Mesh size | | |
|---|---|---|---|
| | 20-35 | 35-50 | 50-100 |
| 1 | 48.9 mg. (97.8%) | 48.7 mg. (97.4%) | 48.4 mg. (96.8%) |
| 2 | 48.75 mg. (97.5%) | 48.6 mg. (97.2%) | 48.6 mg. (97.2%) |
| 3 | 48.65 mg. (97.3%) | 48.8 mg. (97.6%) | 48.75 mg. (97.5%) |

The product of this example has the same properties as that of Example 5.

*Example 7.—A combination of mono-sodium glutamate and di-sodium succinate*

By repeating Example 6, except that a temperature of 70° C. and di-sodium succinate are used instead of 80° C. and mono-sodium asparate, a product is obtained. Samples taken from this product, after drying, are subjected to quantitative analysis as in Example 6, the result being shown in Table 7.

In the case of Table 7, 0.9 percent by weight of di-sodium succinate (relative to the weight of the mixture) was used with the mono-sodium glutamate.

TABLE 7

| Sample No. | Mesh size | | |
|---|---|---|---|
| | 20-35 | 35-50 | 50-100 |
| 1 | 8.811 mg. (97.9%) | 8.802 mg. (97.8%) | 8.838 mg. (98.2%) |
| 2 | 8.775 mg. (97.5%) | 8.811 mg. (97.9%) | 8.811 mg. (97.9%) |
| 3 | 8.802 mg. (97.8%) | 8.793 mg. (97.7%) | 8.802 mg. (97.8%) |

*Example 8.—A combination of mono-sodium glutamate and di-sodium succinate*

By repeating Example 7 except that a temperature of 95° C. is used instead of 70° C., a product is obtained.

Samples taken from this product, after drying, are subjected to quantitative analysis as in Example 7, the result being shown in Table 8. In the case of Table 8, 5.0 percent by weight of di-sodium succinate (relative to the weight of the mixture) was used with the mono-sodium glutamate.

TABLE 8

| Sample No. | Mesh size | | |
|---|---|---|---|
| | 20-35 | 35-50 | 50-100 |
| 1 | 49.05 mg. (98.1%) | 49.05 mg. (98.1%) | 48.8 mg. (97.6%). |
| 2 | 48.9 mg. (97.8%) | 48.9 mg. (97.8%) | 48.75 mg. (97.5%). |
| 3 | 49.9 mg. (98%) | 48.95 mg. (97.9%) | 48.85 mg. (97.7%). |

The product is free-flowing, uniform and transparent.

It is manifest from the foregoing that the described good results are achievable over a considerable range of coating material relative to substrate material. Thus the former may constitute from about 0.5 to about 10 percent of the weight of the mixture.

The starting side of the substrate may vary widely as desired.

Supersaturated steam is not employed.

What is claimed is:

1. A method for preparing a free-flowing compound seasoning consisting essentially of a major proportion of mono-sodium glutamate as the substrate which comprises coating the said substrate by homogeneously admixing the latter at a temperature of 50° C. to 100° C. with a minor proportion of at least one member selected from the group consisting of di-sodium 5'-inosinate, di-sodium 5'-guanylate, mono-sodium asparate and di-sodium succinate, in the presence of a controlled amount of wet steam which is at most saturated, whereupon uniform coating of the substrate without agglomeration is realized, the coating material constituting from about 0.5 to about 10 percent of the weight of the coated product, and the amount of steam corresponding to that necessary to provide only the amount of water required to dissolve the coating material.

2. A method according to claim 1, wherein the coating material is di-sodium 5'-inosinate.

3. A method according to claim 1, wherein the coating material is di-sodium 5'-guanylate.

4. A method according to claim 1, wherein the coating material is mono-sodium asparate.

5. A method according to claim 1, wherein the coating material is di-sodium succinate.

References Cited

UNITED STATES PATENTS

| 3,104,171 | 9/1963 | Sakaguchi et al. | 99—140 |
| 3,109,741 | 11/1963 | Toi et al. | 99—140 |
| 3,198,638 | 8/1965 | Yasumatsu et al. | 99—143 X |

OTHER REFERENCES

Japanese application 37/1,666, May 1962.

ALVIN E. TANENHOLTZ, *Primary Examiner.*